UNITED STATES PATENT OFFICE.

ALBRECHT SCHMIDT AND ADOLF STEINDORFF, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

PREPARATION SUITABLE FOR THE INDIGO VAT.

1,096,060.      Specification of Letters Patent.      Patented May 12, 1914.

No Drawing.      Application filed July 18, 1911. Serial No. 639,087.

*To all whom it may concern:*

Be it known that we, ALBRECHT SCHMIDT, Ph. D., chemist, and ADOLF STEINDORFF, Ph. D., chemist, citizens of the Empire of Germany, residing at Höchst-on-the-Main, Germany, have invented certain new and useful Improvements in Preparations Suitable for the Indigo Vat, of which the following is a specification.

In U. S. Letters Patent Nos. 1,058,019 and 1,058,020, granted April 1, 1913, to Albrecht Schmidt, assignor, it has been set forth that indigo in an extremely finely-divided form is obtained by precipitating indico-leuco compounds in presence of aromatic sulfonic acids or carboxylic acids, for instance those containing the benzyl residue. Furthermore, in U. S. Letters Patent No. 1,005,481, granted October 10, 1911, to Albrecht Schmidt, assignor, it has been set forth that by adding the bodies mentioned in Patent No. 1,058,019 to indigo-leuco compounds, there can be obtained indigo-white preparations possessing the property of particularly well dividing in the cold glucose vat, in such a manner that the indigo separating during the use of this vat, under the action of atmospheric oxygen, is not obtained in the usual form but in the easily-reducible form, described in Patent No. 1,058,019. Now, we have found that in a similar way and with a similar result as stated with regard to indigo-white in Patent No. 1,005,481, there can also be manufactured preparations from indigo by the addition or interaction of the bodies named in Patents 1,058,019 and 1,058,020.

Example: 1000 parts by weight of indigo-paste of 20% are mixed with 40, or 100 or 200 parts of sodium benzylsulfanilate, or of the salts of one of the other acids named in Patent 1,058,019, for instance the salt of phenylbenzyldimethyl-ammoniumchlorid disulfonic acid. The mixture can be directly used for the vat. The mixture may also be triturated for a longer time, or ground or repeatedly passed in the form of a paste through the disintegrator, or it may be heated for a prolonged time to a higher temperature while stirring. Of course, the pastes may be allowed to dry up into solid products, with or without adding any admixture such as clay, starch, glycerin, or one of the saccharine bodies named in U. S. Letter Patent 906,302, or the like.

The term "indigo" as used in the claims is intended to indicate any indigo preparation, for example those described in the specified prior Schmidt patents. The term "acid radical" as used in the claims is intended to include the acids *per se* and their salts.

Having now described our invention, what we claim is:

1. A mixture containing indigo and an aromatic acid radical, which latter possesses no dyeing properties.
2. A mixture containing indigo and a benzyl-sulfanilic-acid radical.
3. A mixture containing indigo and an aromatic acid radical, which latter possesses no dyeing properties, and a saccharine substance.
4. A mixture containing indigo, a benzyl-sulfanilic-acid radical, and a saccharine substance.

In testimony whereof, we affix our signatures in presence of two witnesses.

ALBRECHT SCHMIDT.
         ADOLF STEINDORFF.

Witnesses:
     JEAN GRUND,
     CARL GRUND.